N. E. JOHNSEN & S. ADAMS.
Mousing-Hooks.

No. 163,660. Patented May 25, 1875.

WITNESSES:
E. Wolff
N. F. Terry

INVENTOR:
N. E. Johnsen and
BY S. Adams
ATTORNEYS.

UNITED STATES PATENT OFFICE.

NELS. E. JOHNSEN AND SAMUEL ADAMS, OF CHELSEA, MASSACHUSETTS.

IMPROVEMENT IN MOUSING-HOOKS.

Specification forming part of Letters Patent No. 163,660, dated May 25, 1875; application filed April 17, 1875.

*To all whom it may concern:*

Be it known that we, NELS. E. JOHNSEN and SAMUEL ADAMS, of Chelsea, in the county of Suffolk and State of Massachusetts, have invented a new and useful Improvement in Mousing-Hooks, of which the following is a specification:

This invention relates to hooks used by sailors for attaching or securing certain parts of the rigging of a vessel. "Mousing," a hook (in sailors' parlance) is simply tying a line around the hook to keep the link in place, or to keep it from unhooking.

In the present invention a hook is constructed that is "moused" securely when it is closed; and it consists in a slide on the link of the hook, which is so fastened to the link that the hook is prevented from opening until the slide is moved.

Figure 1:
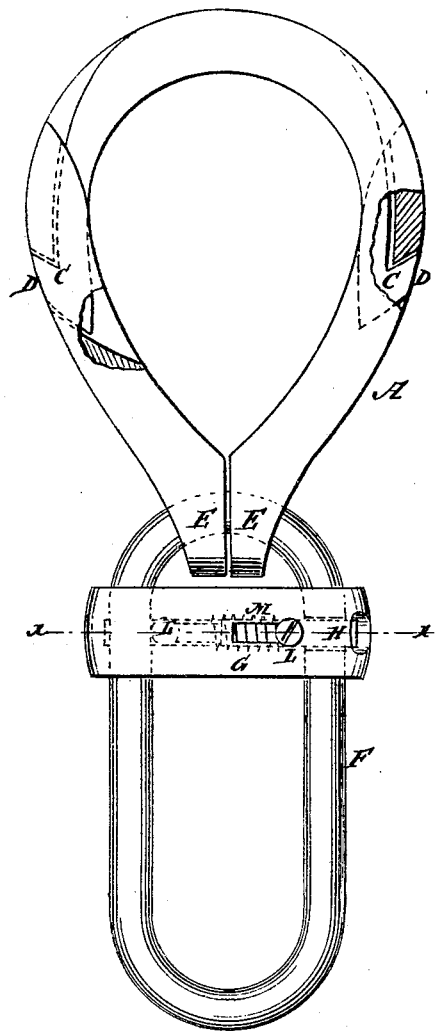
Figure 2:
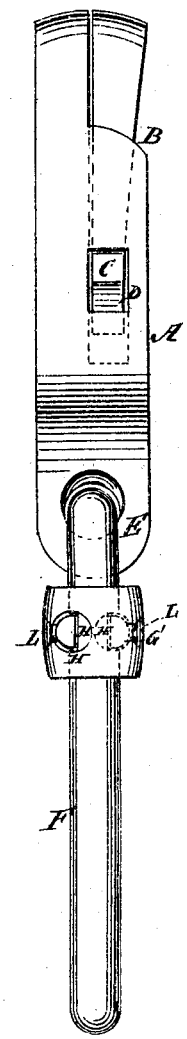
Figure 3:
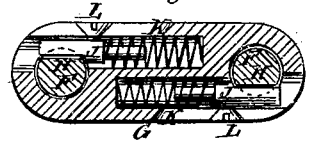

In the accompanying drawing, Figure 1 is a side view. Fig. 2 is an edge view; and Fig. 3 is a detail section, showing the slide fastenings, taken on the line $x\ x$ of Fig. 1.

Similar letters of reference indicate corresponding parts.

A represents the hook proper, made in two parts, which are lapped together. Each part has a shoulder, B, and a hook, C, on the extreme ends, which hooks pass into channels, which are indicated by dotted lines in the drawing, and show themselves through the orifice D in the edge of the hook. The form of these hooks C is seen in Fig. 1, partly in dotted lines, and partly where the drawing is broken away. When the parts of the hook are fastened together in this manner they cannot be separated except by expanding or spreading the ends E E. F is a link, which passes through holes in the ends E E, which ends are prevented from spreading by the curve of the end of the link. To keep the hook in this position on the link the slide G is employed. On opposite sides of the link is a groove or channel, H, and in the slide are recesses I, in which are spring-catches J. K are spiral springs, which force the slides or catches J into the grooves in the link, as seen in Fig. 3.

When the slide G is in the position seen in Fig. 1, it is thus fastened, and the hook A is prevented from opening. When it is desired to open the hook, the sliding catches J J are forced inward and from the grooves H, which allows the slide G to slip back on the link, and the hook A to be turned, and the ends E E to be spread and opened. The slides J J are moved back by means of projecting pins L attached thereto in the slots $m$. The pins or screws L project through the slots, and allow finger-hold for drawing them back. When the slide G is replaced, the slides or catches J J enter the grooves automatically, and fasten it. This hook is made of iron or other strong metal, and is both durable, safe, and convenient.

Having thus described our invention, we claim as new and desire to secure by Letters Patent—

1. The combination of a mousing-hook, consisting of two parts, with a link and slide thereon, and operating substantially as shown and described.

2. The combination of a mousing-hook and a link, with an adjustable slide, which slide is fastened on the link by means of spring-catches J J, and grooves or channels in the link, as described.

NELS. E. JOHNSEN.
SAMUEL ADAMS.

Witnesses:
MICHAEL BOURKE,
FREDRICK GRIFFITH,
HAMLETT BATES.